Figure 1:
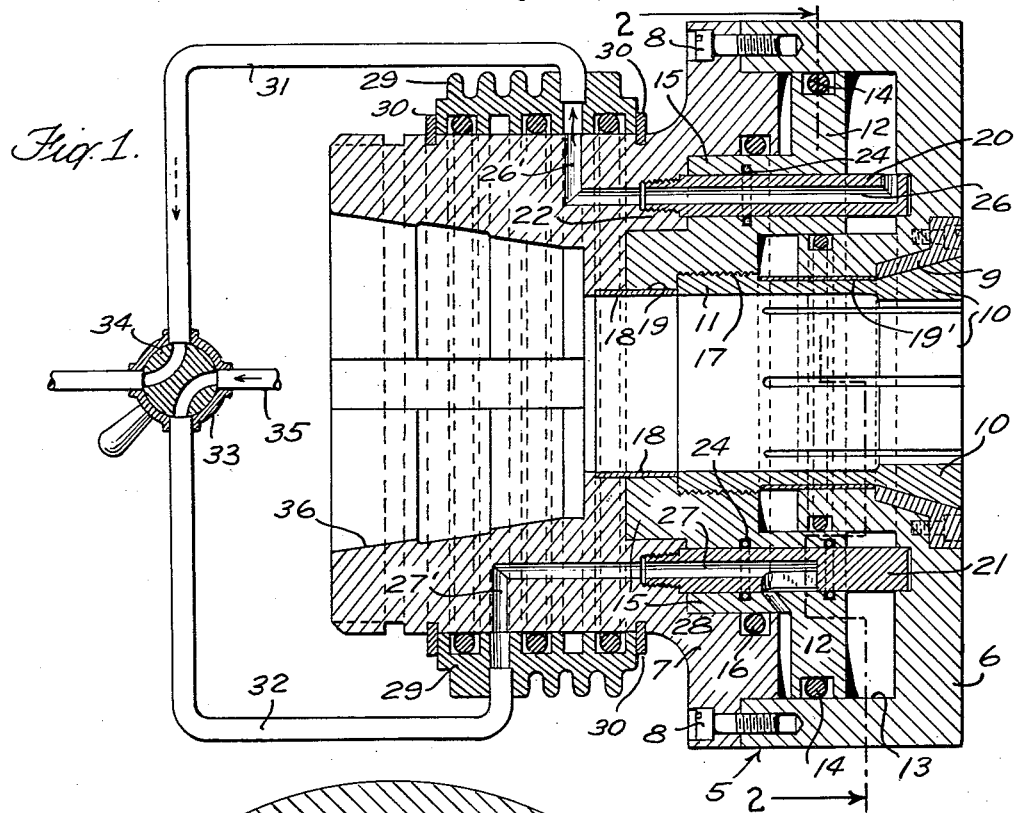

April 16, 1957  W. F. SKILLIN  2,788,979
HYDRAULIC CHUCK
Filed April 2, 1954

Inventor
WALTER F. SKILLIN.
By Mitchell Bechert
Attorney

United States Patent Office 2,788,979
Patented Apr. 16, 1957

2,788,979
HYDRAULIC CHUCK

Walter F. Skillin, New Britain, Conn., assignor to Union Manufacturing Company, New Britain, Conn., a corporation of Connecticut Application April 2, 1954, Serial No. 420,506

5 Claims. (Cl. 279—4)

My invention relates to a power chucking means.

Generally speaking, power operated chucks are actuated by pistons at the rear ends of the spindles away from the chucks carried by the spindles. Such a construction requires that the chuck be put on the spindle end and all of the connections made to a power cylinder or the like at the far end of the spindle, and there are other complications involved in installing and operating such a chuck or collet.

It is one object to provide a chucking means having motor means carried by the chuck body and having all connections in the chuck body itself so that the entire chucking means will be self-contained and unit handling irrespective of a spindle, which usually would carry the chuck.

It is a further object to provide a chuck having fluid-actuated means embodied in the chuck body, and having fluid pressure connections carried by the chuck body and operable at the rear of the chuck.

In general the object is to provide an improved power operated chucking means.

Other objects and various features of novelty and improvement will hereinafter be pointed out or will become apparent to those skilled in the art.

This invention is shown as embodied in a power collet, but it is understood that other chucking mechanisms may be employed.

Figure 2:
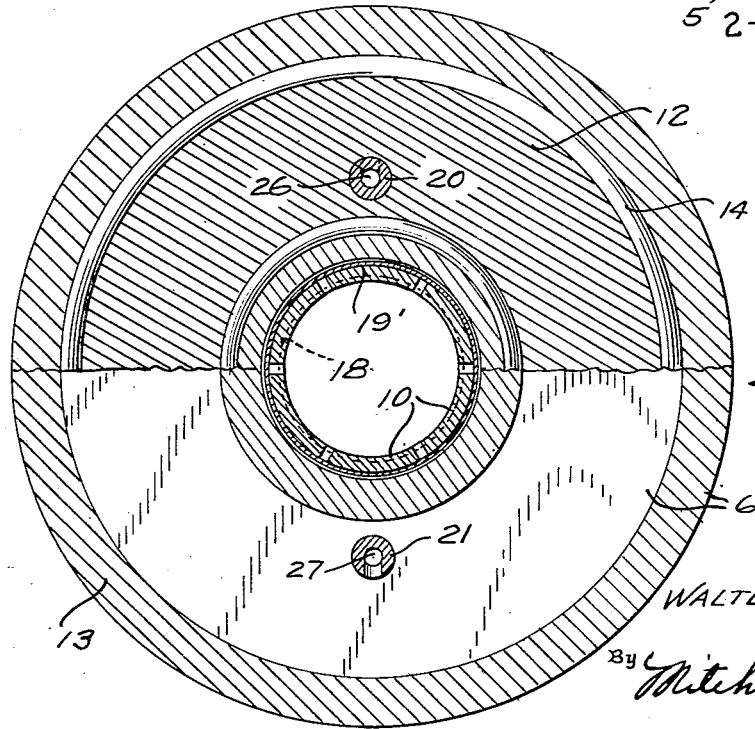

In the drawings, which show, for illustrative purposes only, a preferred form of the invention:

Fig. 1 is a central longitudinal sectional view of a chuck illustrating the invention; and Fig. 2 is a sectional view taken substantially in the plane of the line 2—2 of Fig. 1.

The chuck, as illustrated, comprises a body 5, which may consist of a front body plate 6 and a rear body plate 7, said plates being connected as by means of screws 8 or the like. The chuck body preferably includes an adapter or pilot plate 9 having a tapered inner seat surface for receiving jaws 10 of a collet, as will be understood. The collet includes the jaws 10 and the split sleeve dividing the jaws, together with a rear sleeve portion 11, which is secured to fluid pressure actuated means, in this case a piston 12. The body, and particularly the front plate 6, is provided with a cylinder 13, for the piston 12 fitting therein. A suitable packing ring 14 maintains a tight joint between the piston and cylinder.

The piston 12 has a rearward extension 15, which fits in a counterbore in the rear section 7 of the chuck body, and a suitable packing ring 16 maintains a tight joint. The rear of the piston 12 has a threaded bore for receiving the threaded sleeve on the collet, as indicated at 17. There is a protecting sleeve 18 fixedly carried in a bore in the rear section 7, as will be clear, and the rear end of the piston 12 has a sliding fit, as indicated at 19, on this sleeve. Thus, as the piston moves forward and rearward, a tight joint is maintained at 19.

In order to prevent the entry of chips and other debris through the slots of the collet, I preferably enclose the collet sleeve in a rubber tube 19', so that any debris tending to work through the collet slots will be caught by the sleeve 19' and prevented from getting into the cylinder 13. It will be seen that, when the piston 12 moves forward, that is, toward the right, the collet jaws 10 will open; and when the piston moves rearward, that is, to the left, the collet jaws 10 will be moved toward each other, as will be understood. The sleeves 19—19' serve to prevent entry of foreign matter to the moving parts of the piston and cylinder mechanism.

In order to supply pressure fluid to opposite ends of the cylinder 13, I preferably provide a pair of studs 20—21, which preferably have threaded ends for reception in tapped holes 22—23 in the back plate 7 of the body. These studs 20—21 extend through bores in the piston 12, and, if desired, sealing means 24 may be employed for maintaining a tight joint. The studs 20—21 are seated at the forward ends in cups or depressions in the front plate 6, as will be clear. Thus the piston will be prevented from rotating in the cylinder. The studs 20—21 have bores therein. The bore 26 in the stud 20 extends toward the forward end thereof, and opens laterally into the righthand side of the cylinder 13. The other stud 21 has a bore 27 therein which opens laterally into the cylinder 13 at the lefthand side of the piston 12. The bores or passages 26—27 are continuations of registering passages in the rear chuck body 7, and these passages open out laterally, as indicated at 26'—27'.

Pressure fluid is conducted to and from the passages 26'—27' through a stationary sleeve 29, which has a running fit on the outside of the chuck body. The sleeve may be held against longitudinal displacement by snap rings 30, as will be clear. This ring or sleeve 29 has annular passages communicating with the passages 26'—27', and the sleeve has pipe connections 31—32, which are connected to a valve casing 33, and these passages are controlled by the valve 34. When the valve is in the position shown in the drawings, high pressure fluid enters through the inlet pipe 35, then through the valve into the pipe 32, and then through the stud passage 27' to the lefthand side of the piston 12, so as to urge the piston toward the right or in unchucking direction. At the same time, pressure fluid which may be on the righthand side of the piston 12 escapes through the passage 26 and connecting passages 26' and pipe 31 to the valve, where it escapes back to the sump, if liquid is employed, or may escape to the air in the case of an air operated chuck. When the valve 34 is shifted through 90 degrees, the pressure connections to the cylinder will be reversed. It will be seen, therefore, that by shifting the position of the valve 34 from one 90 degrees position to the other, the piston 12 will be reciprocated, and the collet jaws will move toward the right or the left for chucking or unchucking, as will be clear.

The rear of the chuck body is provided with a seat 36 for receiving the front end of a spindle. It will be seen, however, that all of the fluid pressure actuated mechanism is carried by the chuck and not by the spindle. Therefore the chuck and its fluid pressure connections will be a unit-handling device and may be applied as a unit to a suitable spindle. The chuck is symmetrical and properly balanced. It will, furthermore, be seen that all working parts of the chuck are adequately guarded so as to prevent an accumulation of foreign matter to impair the operation of the chuck.

While the invention has been described in considerable detail and a preferred form illustrated, it is to be understood that various changes and modifications may be made within the scope of the invention, as defined in the appended claims.

I claim:

1. In a power collet, a body composed of front and rear sections, said body having a cylinder therein, a collet in said body, pressure fluid passage means to both ends of said cylinder, a piston in said cylinder and connected to said collet, said pressure fluid passage means to at least one end of said cylinder including a hollow stud carried by one body section and passing through said piston to prevent the latter from turning.

2. In a power chuck, a chuck body, a cylinder in said body, a piston in said cylinder, axially extending studs in said body and having passageways to conduct pressure fluid to said cylinder, chuck jaws in said body and connected to said piston, and means for controlling the flow of pressure fluid to said stud passageways, said piston having bearing openings for slidably receiving said studs to prevent turning of said piston in said cylinder.

3. In a chuck, a chuck body including an axial cylinder, a piston on said cylinder, chucking means in said body and connected for operation to said piston, a hollow stud secured to a part of said cylinder, said piston having a passage for slidably receiving said hollow stud for preventing said piston from rotating in said cylinder, said hollow stud being connected to a source of fluid under pressure, and opening into said cylinder at one side of said piston.

4. In a chuck, a chuck body including a cylinder therein having heads, a piston in said cylinder, a hollow pressure fluid conducting stud extending longitudinally through cylinder, said stud being secured to one cylinder head, said other cylinder head having a seat for the other end of said stud, said piston having a passage for slidably receiving said stud to prevent rotation of said piston in said cylinder.

5. In a chuck, a chuck body, piston and cylinder means in said body, chucking means, means for connecting said piston and cylinder means and said chucking means for actuating the latter by said piston and cylinder means, a hollow stud associated with said piston and cylinder means for preventing relative rotation between the piston and the cylinder, and means for conducting pressure fluid to said hollow stud, said hollow stud having an opening to the cylinder at one side of the piston therein.

References Cited in the file of this patent

UNITED STATES PATENTS

| | | |
|---|---|---|
| 391,585 | Cooper | Oct. 23, 1888 |
| 728,572 | Hanson | May 19, 1903 |
| 2,393,458 | Cook | Jan. 22, 1946 |
| 2,418,082 | Marasko | Mar. 25, 1947 |
| 2,500,383 | Sadler et al. | Mar. 14, 1950 |
| 2,620,196 | Church | Dec. 2, 1952 |